INVENTOR
MICHAEL ANTHONY HULSE
ATTORNEYS

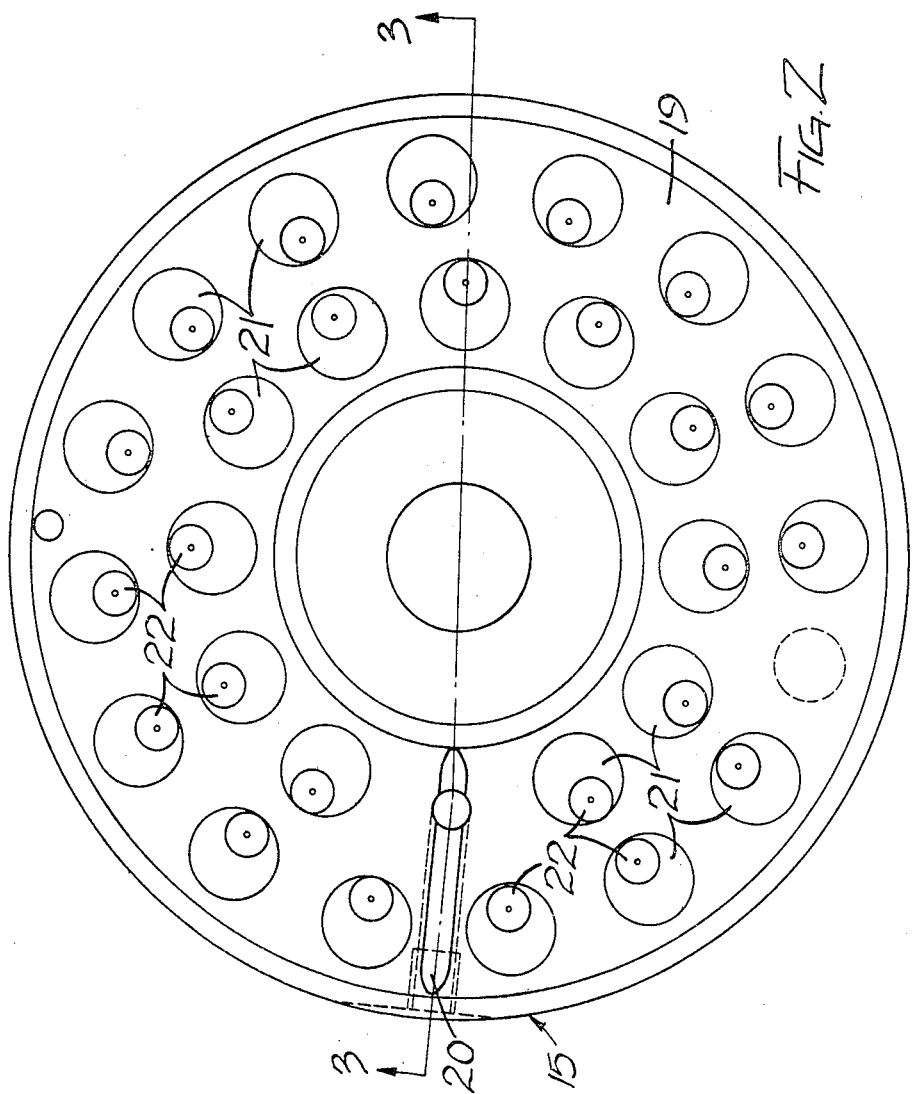

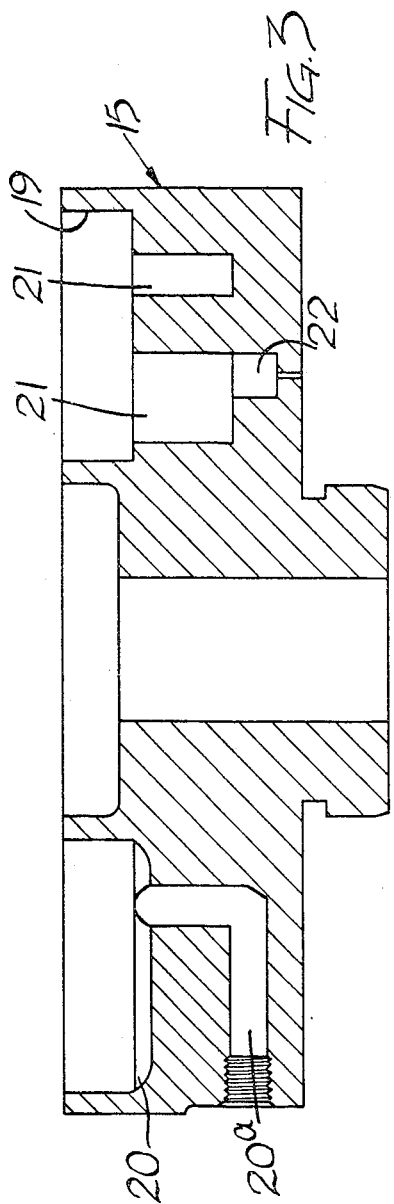

United States Patent Office 3,483,042
Patented Dec. 9, 1969

3,483,042
METHOD OF AND DEVICE FOR FILLING THE CELLS OF A BATTERY WITH ELECTROLYTE
Michael Anthony Hulse, Solihull, England, assignor to Joseph Lucas (Industries) Limited, Birmingham, England, a British company
Filed Oct. 16, 1967, Ser. No. 675,442
Claims priority, application Great Britain, Oct. 17, 1966, 46,279/66
Int. Cl. H01m 21/00, 11/00
U.S. Cl. 136—162    5 Claims

ABSTRACT OF THE DISCLOSURE

A method of and device for filling the cells of a battery with electrolyte includes introducing metered quantities of electrolyte into reservoirs positioned above the cells of the battery respectively, the reservoirs and their respective cells being interconnected but the arrangement being such that electrolyte cannot flow from the reservoirs into the cells at this stage. The spaces above the reservoirs are then exhausted so that the air from the cells bubbles through the electrolyte and the cells become exhausted. Finally the pressure in the spaces above the reservoirs is increased so that electrolyte then flows from the reservoirs into the respective cells.

---

Figure 1:
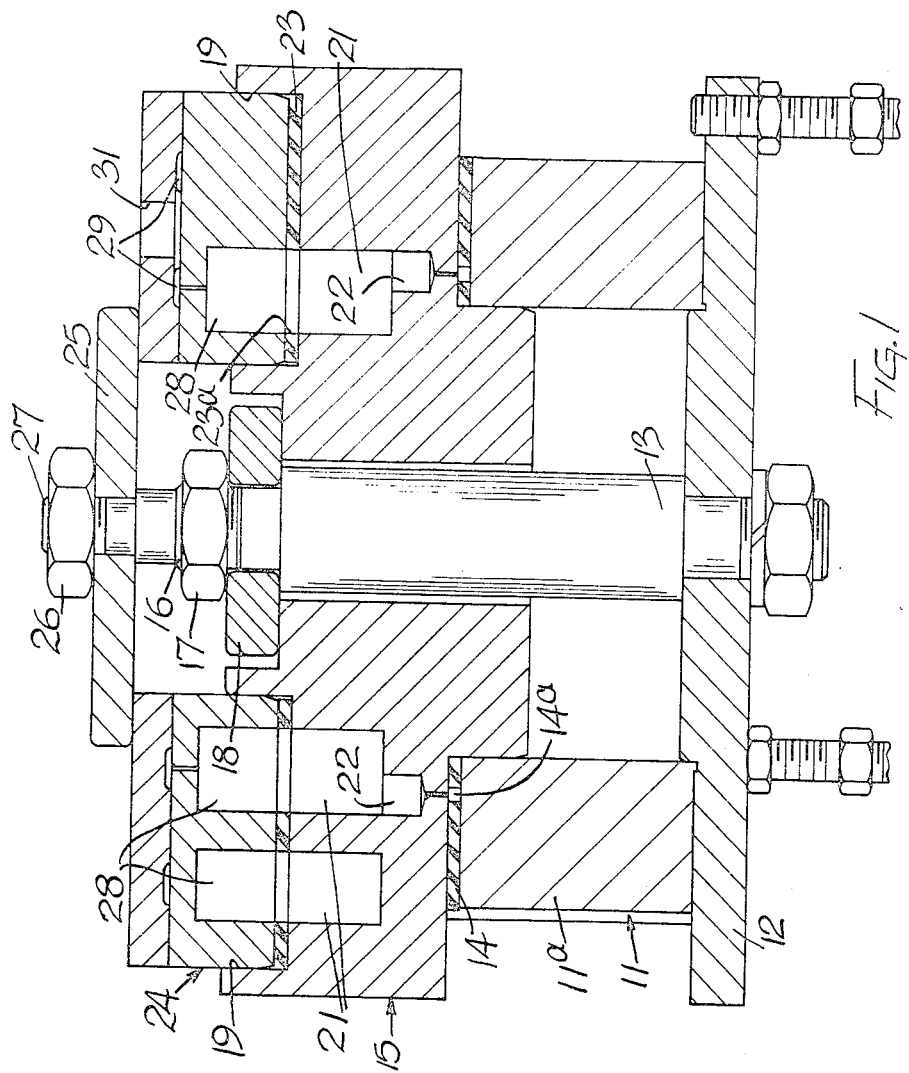

This invention relates to a method of filling the cells of a battery with an electrolyte.

A method according to the invention comprises introducing metered quantities of electrolyte into reservoirs positioned above the cells of the battery respectively, the reservoirs and the respective cells being interconnected but the arrangement being such that electrolyte cannot flow from the reservoirs to the cells at this stage, exhausting the air from the spaces above the reservoirs so that the air from the cells bubbles through the electrolyte and the cells become exhausted, and then increasing the pressure in said spaces so that electrolyte flows from the reservoirs into the exhausted cells.

The invention further resides in means for carrying the method into effect.

In the accompanying drawings;

FIGURE 1 is a sectional view of one example of a filling device for carrying out a method in accordance with one example of the invention, FIGURE 2 is a plan view of the manifold block of the device shown in FIGURE 1, and FIGURE 3 is a sectional view on the line 3—3, of FIGURE 2.

The filling device illustrated in the drawings is intended for use with an annular alkaline battery 11, the cells 11a of which are arranged in two concentric circular rows. The device comprises a circular base 12 having a post 13 extending axially therefrom, the battery 11 being placed on the base 12, which is shaped to maintain the battery 11 coaxial with the post 13. A gasket 14 composed of resilient material which is impervious to electroylte is placed on top of the battery, the gasket being formed with holes 14a which correspond with the filling holes of the cells 11a of the battery. A manifold block 15 is placed on the gasket 14, the post 13 extending through the block 15. The post 13 is formed with a first screw threaded portion 16 with which is engaged a nut 17 which bears on a washer 18 to urge the block 15 into sealing relationship with the gasket and the battery 11.

The upper surface of the block 15 is formed with an annular trough 19, the base of the trough being formed with two concentric circular rows of identical recesses 21. Each recess 21 communicates with a cell of the battery through a passage 22 which is aligned with the respective hole 14a in the gasket 14, the passages 22 being of reduced diameter at their lower ends. A second resilient gasket 23 which is impervious to electrolyte is engaged with the base of the trough 19, the gasket being formed with holes 23a corresponding with the recesses 21. In order to ensure correct alignment, the battery 11, the gasket 14, and the block 15 are each provided with an index groove (not shown) in their periphery, the grooves being engaged, during assembly, by a pin which projects upwardly from the base 12.

Engaged in the trough 19 is an annular member 24 which is clamped against the gasket 23, through a washer 25, by a nut 26 engaging a second screw threaded portion 27 of the post 13. The member 24 is formed with a plurality of bores 28 corresponding with the recesses 21 of the block 15, and incorporates an index groove (not shown) in its periphery which is engaged by a pin (not shown) upstanding from the block 15, when the bores 28 are correctly aligned with the recesses 21. The two rows of bores 28 communicate respectively with a pair concentric annular passages 29 formed in the member 24, the passages 29 being connected with a common conduit 31.

In order to fill the cells 11a of the battery 11 with the required quantity of electrolyte, the member 24 is removed and electroylte is poured into the trough 19. The electrolyte fills the recesses 21, and a state of equilibrium is reached wherein the electrolyte does not flow through the narrow part of the passages 22 into the cells 11a. The base of the trough 19 is provided with a radial drainage channel 20 which communicates with a drainage passage 20a formed in the block 15 and excess electrolyte flows from the trough 19 through the channel. The recesses 21 are so proportioned as to meter the exact quantity of electrolyte required in the cells 11a and when the excess electrolyte is drained from the trough 19 a raised meniscus is formed over each recess. The additional electrolyte contained in the meniscus is not required and is removed by wiping the base of the trough with a flat wiper to urge the excess electrolyte into the drainage channel 20.

After the excess electrolyte has been drained from the trough 19 the member 24 is replaced and the conduit 31 connected to source of vacuum. As the air is exhausted from the bores 28 a pressure gradient is established between the bores 28 and the cells 11a of the battery and air bubbles up through the electrolyte in the recesses 21 from the cells 11a until a vacuum exists in the cells 11a and in the bores 28. Electrolyte still does not flow through the passages 22 into the cells 11a, but at this stage the conduit 31 is opened to atmosphere and atmospheric pressure forces all of the electrolyte from the recesses 21 into the evacuated cells 11a. The cells are thus filled accurately with the metered quantity of electrolyte.

Since each recess 21 has an individual bore 28 associated therewith any electrolyte which splashes from recess 21 during evacuation of the cells 11a is retained within the respective bore 28 and runs back into the associated recess 21, whereas if the recesses 21 had a common chamber above them then it would be unlikely that electrolyte splashing from the recesses 21 would be returned thereto. Thus the provision of the bores 28 ensures that an accurately metered quantity of electrolyte is delivered to each cell 11a.

Having thus described my invention what I claim as new and desire to secure by Letters Patent is:

1. A method of filling the cells of a battery with electrolyte comprising introducing metered quantities of electrolyte into reservoirs positioned above the cells of the battery respectively, the reservoirs and the respective cells being interconnected but the arrangement being such that electrolyte cannot flow from the reservoirs to the cells at this stage, exhausting the air from the spaces above the reservoirs so that the air from the cells bubbles through the electrolyte and the cells become exhausted, and then increasing the pressure in said spaces so that electrolyte flows from the reservoirs into the exhausted cells.

2. A method of filling the cells of a battery with electrolyte comprising positioning a manifold block, having therein a plurality of electrolyte reservoirs, above the battery to be filled so that passages extending through the block from said reservoirs are aligned with filling holes in the battery thereby placing each reservoir in communication with a respective cell of the battery, introducing a metered quantity of electrolyte into each reservoir, the arrangement being such that the electrolyte cannot flow into the cells at this stage, positioning on said block a member having therein a plurality of bores equal in number to the reservoirs, said bores being above and in communication with the reservoirs respectively, exhausting the air from each of said bores so that air from the cells of the battery passes through the appropriate reservoir and bore so that the cells and bores are exhausted, and then increasing the pressure in said bores so that electrolyte flows from the reservoirs into the respective cells of the battery.

3. A battery filling device for filling the cells of a battery with electrolyte comprising in combination a manifold block, means for clamping the manifold block in engagement with a battery in use, a plurality of electrolyte reservoirs in the manifold block, a plurality of passages in the block, each passage placing a reservoir in communication with a respective battery cell, a member having a plurality of bores equal in number to the reservoirs, said member being positioned on the manifold block so that the bores are above and in communication with the reservoirs, means for clamping the member and manifold block together in such relationship, and passage means leading from the bores to the exterior of said member, said passage means providing communication to the exterior of the device so that the pressure in the bores may be decreased or increased, whereby a decrease of pressure in the bores exhausts the air from the cells through the reservoirs and permits the electrolyte in the reservoirs to flow into the cells upon increasing the pressure in the bores.

4. The device as claimed in claim 3 wherein said passage means are all connected to a common conduit provided in said member through which the pressure may be decreased or increased.

5. The device as claimed in claim 3 wherein said reservoirs are arranged in a circular configuration in the manifold block.

References Cited
UNITED STATES PATENTS

| | | | |
|---|---|---|---|
| 2,448,573 | 11/1949 | Wood. | |
| 2,791,620 | 5/1957 | Blaru | 136—162 XR |
| 2,886,621 | 5/1959 | Hinman | 136—162 XR |
| 2,942,053 | 6/1960 | Baldwin et al. | 136—159 XR |
| 3,169,891 | 2/1965 | Streigle | 136—162 XR |

ALLEN B. CURTIS, Primary Examiner

D. L. WALTON, Assistant Examiner

U.S. Cl. X.R.

136—114, 181